(12) United States Patent
Legare

(10) Patent No.: US 7,459,190 B2
(45) Date of Patent: Dec. 2, 2008

(54) FIRE PROTECTION CONTAINERS INCORPORATING NOVEL LOW FREE WATER INSULATION MATERIALS

(75) Inventor: David J. Legare, Ava, NY (US)

(73) Assignee: Fireking International, Inc., New Albany, IL (US)

( * ) Notice: Subject to any disclaimer, the term of this patent is extended or adjusted under 35 U.S.C. 154(b) by 291 days.

(21) Appl. No.: 10/969,307

(22) Filed: Oct. 20, 2004

(65) Prior Publication Data

US 2005/0106341 A1    May 19, 2005

Related U.S. Application Data

(62) Division of application No. 09/760,426, filed on Jan. 12, 2001, now Pat. No. 6,841,209.

(60) Provisional application No. 60/175,774, filed on Jan. 12, 2000.

(51) Int. Cl.
*A47B 81/00* (2006.01)
*E05G 1/024* (2006.01)

(52) U.S. Cl. ............ 428/34.4; 428/34.6; 428/34.7; 428/920; 428/921; 252/601; 252/607; 252/609; 52/317; 52/396.01

(58) Field of Classification Search ......... 428/34.4, 428/34.6, 34.7, 35.7, 920, 921; 252/601, 252/605, 606, 607, 609; 52/317, 396.01, 52/738.13, 784.11
See application file for complete search history.

(56) References Cited

U.S. PATENT DOCUMENTS

| | | | | | |
|---|---|---|---|---|---|
| 3,622,732 | A | * | 11/1971 | Williams | 219/695 |
| 3,793,055 | A | * | 2/1974 | Shodai et al. | 427/301 |
| 3,892,517 | A | * | 7/1975 | Ebeling et al. | 431/90 |
| 4,018,616 | A | * | 4/1977 | Sugahara et al. | 106/629 |
| 4,136,238 | A | * | 1/1979 | Hilterhaus et al. | 521/107 |
| 6,841,209 | B2 | * | 1/2005 | Legare | 428/34.4 |

FOREIGN PATENT DOCUMENTS

EP        0222720 A2  *   5/1987

* cited by examiner

*Primary Examiner*—Alicia Chevalier
(74) *Attorney, Agent, or Firm*—George R. McGuire; Bond Schoeneck & King, PLLC

(57) ABSTRACT

The present invention contemplates water-bearing silicate materials achieved by modifying the basic method of essentially reacting water glass with calcium chloride to bind the free water into solid form without adversely affecting the basic chemical and physical structure of the original product. The material is then dried by using a wicking agent, such as cellulose sponge, adding an anhydrous salt to the material to form a crystalline hydrate, or adding calcium oxide or calcium hydroxide to the material to form a microstructure that physically retains the water. The material is then incorporated into a fire protection contained in which the material forms the outermost wall of the container, a light-weight porous material such as urethane foam and intermediate layer, and a phase change material with a melting point of about 70 degrees F. to 125 degrees F. forms the innermost wall.

12 Claims, 1 Drawing Sheet

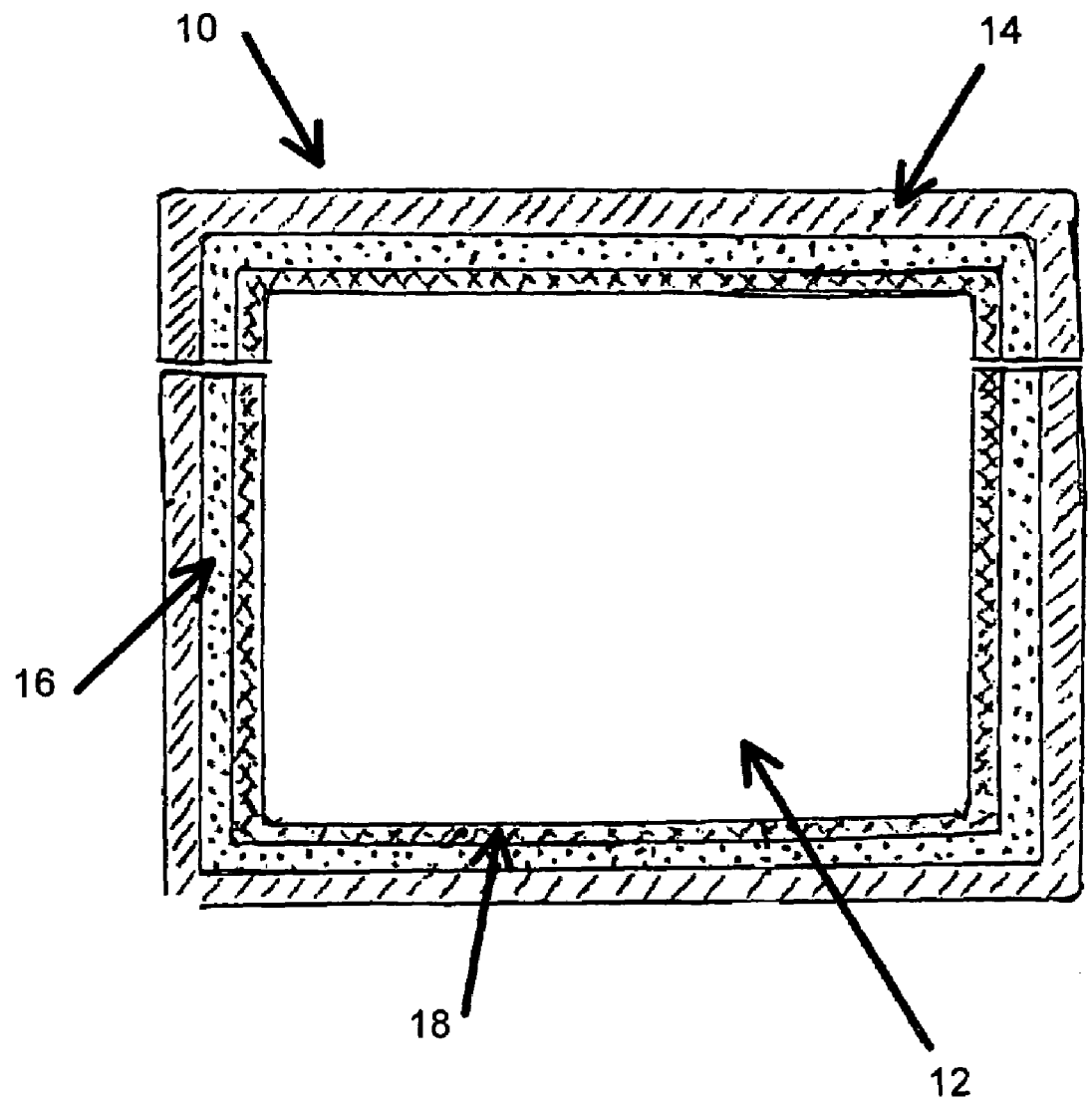

FIRE PROTECTION CONTAINERS INCORPORATING NOVEL LOW FREE WATER INSULATION MATERIALS

REFERENCE TO RELATED APPLICATIONS

The present application is a divisional of application Ser. No. 09/760,426, filed Jan. 12, 2001 now U.S. Pat No. 6,841,209, which claims priority to U.S. Provisional Application Ser. No. 60/175,774, filed Jan. 12, 2000.

BACKGROUND

Portions of the present application have been partially disclosed in the following Disclosure Document which is incorporated herein by reference:

Advanced Slow-Curing Fire Protection Materials, Disclosure Document No. 462049, dated Sep. 19, 1999.

1. Field of Invention

The present invention relates to fire protection containers such as safes, storage boxes, filing cabinets, and other related applications, and to improved insulation materials incorporated therein.

2. Background of Art

Co-Pending application by Applicant describe a novel water-based silicate insulation material which has been used by Thermal Sciences, Inc. for production of fire protection containers under the FireCooler trademark. The material is essentially produced from a combination of sodium silicate solution with a high silica to soda ratio (about 3 to 4, i.e., commercial water glass) and a polyvalent metal salt such as calcium chloride. These components react to form a wet solid. Although it has been shown to outperform virtually all other known fire protection insulation compositions in its class, the material can be difficult to handle due to the fact that is comprises a fairly large percentage of non-chemically bound water which can leach from defects in the container walls.

Currently used compositions utilize a roto-molded plastic shell into which the insulation slurry is poured or injected. After curing, water released from the solidified insulation can migrate to and leak from pinhole defects which sometimes occur in the plastic shell. This creates some difficult quality control problems for the roto-molding vendor. One manufacturing method that was developed to mitigate the problem involved the post-cure insertion of various wicking materials such as cellulose sponge into the insulation fill hole to extract some of the free-water. This did not adversely affect the fire protection performance of the insulation. However, the additional manufacturing step adds to production costs and is a very slow process which can require up to several days to complete.

It is therefore, highly desirable to create an improved insulation formula which is dry (or at least contains a minimal amount of unbound water) on cure and which provides the same fire protection as the parent material. In order to maintain the essential chemical composition and structure of the original insulation, free water reduction has to be based on chemically or physically binding the water in a way that is independent of the basic reactions that form the parent material. The additives used to reduce free water also tend to increase the rate at which the insulation slurry sets up, thus making it more difficult to mix and pour in large quantities. Thus, methods to counteract this undesirable side effect are also desirable.

3. Objects and Advantages

It is a principal object and advantage of the present invention to provide modified formulations of the aforesaid parent material which preserve all of its original fire protection properties and which make the material essentially dry in the cured state.

Another object and advantage of the present invention is to offer manufacturing methods that facilitate an increase in the set-up time of the insulation slurry while maintaining its desirable properties.

An additional object and advantage of the present invention is to provide a fire protection storage container utilizing the improved insulation materials.

Other objects and advantages of the present invention will in part be obvious, and in part appear hereinafter.

SUMMARY OF THE INVENTION

In accordance with the foregoing objects and advantages, the present invention contemplates water-bearing silicate materials for fire protection which are essentially dry when cured. The dryness property is achieved by modifying the basic method of essentially reacting water glass with calcium chloride in such a way as to bind the free water into solid form without adversely affecting the basic chemical and physical structure of the original product. The invention further contemplates the incorporation of these materials into one or more fire protection container configurations such as a multilayered structure in which the insulation forms the outermost wall of the container, an intermediate layer comprising a light weight porous, thermal insulator such as urethane foam, and an innermost layer comprising a phase change material with a melting point of around 70 degrees F to 125 degrees F, depending on the heat bearing characteristics of the objects to be protected.

Besides the aforementioned method of drying the insulation material by physically wicking the excess water from the cured parent material through use of a sponge-like material, two other methods have been developed to bind the free water in the insulation material. The first of these includes the addition of an anhydrous salt to the slurry to form a crystalline hydrate. Dibasic sodium phosphate (NA2HP04) works effectively for this purpose. The second method includes the addition of calcium oxide or calcium hydroxide to the slurry. This converts soluble and/or colloidal silica (SiO2) present in the mixture to calcium silicate (CaSiO3), thereby resulting in a material microstructure which provides more effective physical retention of the water. This second method is assisted by the formation of calcium metasilicate dehydrate (CaSiO3 2H2O) resulting from the additional CaSiO3 produced. The following reactions take place in the above methods:

1) Starting with Calcium Oxide CaO+H2O to Ca(OH) 2
2) Starting with Calcium Hydroxide Ca(OH)2+2NaCl to CaCl2+2NaOH 2NaOH+SiO2 to Na2SiO3+H2O CaCl2+Na2SiO3 to CaSiO3+2NaCl Na2SiOJ(SiO2)x+ CaCl2 to 2NaCl+CaSiOJ(SiO2)x Note that NaCl is present as a byproduct of the reaction of the parent material components.

It has also been found that it can be helpful to increase the sodium silicate content of the mixture without also adding water (as would be present with the addition of more sodium silicate solution) by including a partially hydrated (easily soluble) sodium silicate powder into the slurry. An example of this would be spray-dried sodium silicate sold under the name BriteSil by the Philadelphia Quartz Corporation.

Either one or a combination of the above-methods, the incorporation of either of either anhydrous Dibasic Sodium Phosphate and/or Calcium Oxide or Calcium Hydroxide into the slurry comprising the components of the parent material formulation can be used to produce the dry fire protection insulation material of the present invention. All result in materials with excellent fire protection performance. The only drawback is that the first method (adding dibasic sodium phosphate) can cause a dimensional instability problem in which the material expands unpredictably by several percent over a period of several days after curing. This could be the result of the dibasic sodium phosphate shifting between different states of hydration with a resultant change in crystalline structure. Therefore, this method should only be employed when this post-expansion can be accommodated without physically deforming the walls of the container. Thus, it should be pre-cast, cured and allowed to expand, and then covered with an outer shell that forms the actual product exterior surface. Thus, this formulation would not be well-suited to a product design in which the slurry is to be poured into a roto-molded plastic shell, for example. The above methods (such as the addition of calcium oxide or calcium hydroxide) further reduce the material set-up time, making it more difficult to mix and pour.

In an effort to increase the material set-up time without adversely affecting the desirable properties such as fire resistance, structural integrity and dryness on curing, the present invention optionally includes the addition of a small quantity of one or more water soluble organic materials to the insulation mixture. The additives should preferably be mixed thoroughly into the water glass first, with the solids (calcium chloride, calcium oxide, etc.) then added and mixed in to form the slurry. The additive may comprise about 1 to 8 percent of the total weight of the final product (preferably no more than about 2 to 4 percent). These materials do not form reaction products with the other components of the mixture and do not alter the chemical or structural properties of the cured insulation. The intent behind the use of these additives is to reduce the solubility and mobility of the other reactants to increase the time it takes for the reaction products to form and to slow the subsequent crystallization/solidification that creates the final product.

Three readily available candidate materials have been tested with positive results. This would seem to indicate that the concept is valid for most all water soluble organics. However, it is known that certain ones, such as low molecular weight alcohols (i.e. ethyl and methyl alcohol), may not be practical because they tend to form insoluble gels when they are mixed with the water glass. Other polar compounds such as ethylene and propylene glycol also tend to cause some gelling, but these gels dissolve with further mixing causing the formation of a homogenous, although slightly higher viscosity, water glass mixture. Both ethylene and propylene glycol have been tested and work well in the present invention. However, propylene glycol is preferred because of its low toxicity as compared to ethylene glycol. A water soluble oil (sold for use as a cutting oil for machining metals) was also tested with good success. As expected, the water soluble oil mixed very easily into the water glass with no gelling. Examples of material formulations tested are shown in the Detailed Description below.

The mixing time (time elapsed before the slurry begins to set up and thicken to the point where it can no longer be poured) when incorporating these additives ranged from about 5 minutes to as long as 15 to 20 minutes for sample sizes of about 1.5 pounds. By comparison, each of the formulations tested would have had a mixing time of about 1 to 3 minutes without the presence of the water soluble organic additive. Although it is believed that a very large number of individual water soluble organic compounds and combinations thereof could be successfully used in the present invention, only a few have been tried at the present time. These include ethylene glycol, propylene glycol, and a water soluble machining/metal cutting oil (brand name Rust-Lick WS-5050, Heavy Duty water Soluble Oil, made by ITW Devcon Corp.) The latter contains a number of components such as tripropylene glycol, chlorinated olefins, and modified petroleum distillates. The above additives are apparent in a number of the example material formulations shown below. Note that in all formulations, the water soluble organic additive was first thoroughly mixed into the water glass; the solids (solids are premixed with each other) are then mixed in to the water glass to form the insulation slurry.

BRIEF DESCRIPTION OF THE DRAWINGS

FIG. 1 is a cross sectional view of a fire protection container illustrating its multiple layers.

DETAILED DESCRIPTION

Referring now to the drawing FIGURE, the cross-section of a fire protective container, designated generally by reference numeral 10, is illustrated as comprising a compartment 12 in which miscellaneous articles may be placed that is defined by a mandatory outer layer 14, and an optional intermediate layer 16 and inner layer 18. Outer layer 14 is created by first mixing a slurry comprising the components described in a greater detail hereinbelow, and then casting the slurry to form a solid. The casting method is determined by the specific product design and other manufacturing considerations such as possible post-expansion of the insulation material as described previously.

Although any size fire protection container 10 is conceivable (including an entire room or building) with any fire duration rating (and corresponding wall thickness), the following disclosure is be based on existing product requirements relating to a file drawer sized box with a fire duration capability of about 1 to 2 hour fire exposure with a 3 to 10 hour cool-down period. For this sized container, outer wall 14 is of a thickness of about 1 to 2 inches. This alone will generally be sufficient for the protection of paper and other items which can withstand temperatures of up to about 230 degrees F.

Intermediate and inner layers 16, 18 maintain low internal container temperatures at around 125 to 70 degrees F for the protection of more heat sensitive items such as magnetic and optical date storage media and certain photographic materials, for example. For this purpose, intermediate layer 16 is generally about 0.5 to 2 inches thick and composed of urethane, polystyrene foam, or a similar material. Inner layer 18 is around 0.25 to 1 inch thick and composed of a high heat capacity phase change material which has a melting point at or near the desired maximum internal container temperature. A preferred phase change material is comprised of a combination of dibasic and tribasic sodium phosphate ($Na_2HPO_4$, $Na_3PO_4$), water, and optionally, a lesser amount of sodium silicate solution (a commercial grade of water, glass, for example). As previously indicated, these phase change formulations will maintain internal container temperature in the range of about 70° to 125° F. under the conditions stated above.

Examples of phase change formulations currently tested are; in parts by weight (Water; 154, $Na_2HPO_4$ anhydrous; 100, $Na_3PO_4 \cdot 12H_2O$; 70), (Water Glass; 4, Water; 13.14, $Na_2HPO_4$ anhydrous; 10, $Na_3PO_4 \cdot 12H_2O$; 3.86, "Impurity"; 0 to 3), (Water Glass; 4, Water; 8, $Na_2HPO_4$ anhydrous; 10, $Na_3PO_4 \cdot 12H_2O$; 10, "Impurity"; 0 to 3). The "Impurity" shown in the above can be anyone of a number of water soluble salts wherein either or both of the anion or cation are chosen to be substantially different from the other components of the mixture (i.e., in terms of atomic/molecular weight). The purpose of this is to help prevent a potential post expansion of the cooled/solidified phase change material similar to what happens when Na2HP04 is added to the fire-protection insulation material as described hereinbefore.

The slurry that composes outer layer 14 is produced by mixing together the components listed in the following examples. The solids should generally be added to the water glass solution and mixed thoroughly for a period of about 10 to 60 seconds. The slurry is then injected or poured into the appropriate mold or shell (i.e., a roto-molded plastic shell) and allowed to fully set and cure.

EXAMPLES

The Water Glass in all of the following compositions is generally a commercial grade sodium silicate solution which is about 40% solids, 60% water, and has a $SiO_2:Na_2O$ ration of about 2:1 to 4:1 (in the range of about 2 to 4, and preferably about 3.2). Some specific examples are:

| Component | Amount in parts by weight |
|---|---|
| 1) Water Glass | 56 |
| Calcium Metasilicate | 0 to 2 |
| Dibasic Sodium Phosphate ($Na_2HPO_4$ anhydrous) | 6 to 12 |
| Calcium Chloride (monohydrate) or dehydrate form; flake or granular particles, size about 2 to 5 millimeters) | 5 to 8 |
| Propylene Glycol and/or Water-Soluble Oil | 0 to 3 |
| 2) Water Glass | 56 |
| Spray-dried Sodium Silicate (BriteSil) ($SiO_2:Na_2O$ ratio about 2 to 3.5) | 0 to 12 |
| Calcium Oxide and/or Calcium Hydroxide | 4 to 10 |
| Calcium Chloride (type same as above) | 2 to 10 |
| Propylene Glycol and/or Water-Soluble Oil | 0 to 3 |
| 3) Water Glass | 56 |
| Spray-dried Sodium Silicate (type same as above) | 0 to 12 |
| Calcium Oxide and/or Calcium Hydroxide | 2 to 10 |
| Dibasic Sodium Phosphate (Anhydrous) | 4 to 12 |
| Calcium Chloride (type same as above) | 2 to 10 |
| Propylene Glycol and/or Water-Soluble Oil | 0 to 3 |
| 4) Water Glass | 20 |
| Ethylene Glycol | 1 |
| Calcium Oxide | 2 |
| Calcium Chloride | 3.2 |
| MIXING TIME: 5 minutes | |
| 5) Water Glass | 20 |
| Ethylene Glycol | 2 |
| Calcium Oxide | 2 |
| Calcium Chloride | 3.2 |
| MIXING TIME: 7 minutes | |
| 6) Water Glass | 20 |
| Propylene Glycol | 1.2 |
| Calcium Oxide | 2 |
| Calcium Chloride | 3.2 |
| MIXING TIME: 7 to 8 minutes | |
| 7) Water Glass | 20 |
| Propylene Glycol | 1.2 |
| Calcium Oxide | 2 |
| Calcium Chloride | 2.4 |
| BRITESIL C24 | 2 |
| MIXING TIME: 12 minutes | |
| 8) Water Glass | 20 |
| Propylene Glycol | 1.2 |
| Calcium Oxide | 2 |
| Calcium Chloride | 2.4 |
| MIXING TIME: 12 minutes | |
| 9) Water Glass | 20 |
| Propylene Glycol | 1.2 |
| Calcium Oxide | 2.5 |
| Calcium Chloride | 2.4 |
| MIXING TIME: 5 to 7 minutes | |

The Propylene Glycol used was an automotive coolant brand mixed 50/50 with water.

BRITESIL C24 is a spray-dried, highly water soluble sodium silicate powder made by the PQ Corporation.

| Component | Amount in parts by weight |
|---|---|
| 10) Water Glass | 20 |
| Water Soluble Oil | 1 |
| Calcium Oxide | 2 |
| Calcium Chloride | 3.2 |
| MIXING TIME: 13 minutes | |
| 11) Water Glass | 20 |
| Water Soluble Oil | 1 |
| Calcium Oxide | 2 |
| Calcium Chloride | 2.4 |
| MIXING TIME: 20 minutes | |
| 12) Water Glass | 20 |
| Water Soluble Oil | 1 |
| Calcium Oxide | 3 |
| Calcium Chloride | 2.4 |
| MIXING TIME: 5 to 6 minutes | |
| 13) Water Glass | 20 |
| Water Soluble Oil | 1 |
| Calcium Oxide | 2.5 |
| Calcium Chloride | 2.4 |
| MIXING TIME: 10 to 12 minutes | |

Each of these examples produces an outer layer 14 having superb insulation properties to protect the contents of container 10 from heat and fire, and which is essentially dry in a cured state.

What is claimed is:

1. A fire protective container, comprising:
   a. an outer wall consisting essentially of:
      i. water glass composed of a sodium silicate solution that is about 40% solids, 60% water, and having a SiO2:Na2O ratio in the range of about 2:1 to 4:1;
      ii. calcium chloride; and
      iii. an additive chosen from the group of calcium oxide or calcium hydroxide.

2. The fire protective container of claim 1, further comprising:
   a. an intermediate wall; and
   b. an inner wall composed of a phase change material.

3. The fire protective container of claim 2, wherein said outer wall is about 1 to 2 inches thick, said intermediate wall is about 0.5 to 2 inches thick, and said inner wall is about 0.25 to 1 inch thick.

4. The fire protective container of claim 3, wherein said intermediate wall is composed of urethane.

5. The fire protective container of claim 3, wherein said intermediate wall is composed of polystyrene foam.

6. The fire protection container of claim 1, wherein said outer wall further consists essentially of:
   a. spray dried sodium silicate; and
   b. propylene glycol.

7. The fire protection container of claim 2, wherein said outer wall consists essentially of:
   a. 56 parts by weight of said water glass;
   b. 0 to 12 parts by weight of said spray dried sodium silicate;
   c. 4 to 10 parts by weight of said additive;
   d. 2 to 10 parts by weight of said calcium chloride; and
   e. 0 to 3 parts by weight of said propylene glycol.

8. The fire protection container of claim 1, wherein said outer wall further consists essentially of anhydrous dibasic sodium phosphate.

9. The fire protection container of claim 8, wherein said anhydrous dibasic sodium phosphate is added in 4 to 12 parts by weight.

10. A fire protection container, comprising:
    a. an outer wall consisting essentially of:
       i. water glass composed of a sodium silicate solution that is about 40% solids, 60% water, and having a $SiO_2$:$Na_2O$ ratio in the range of about 2:1 to 4:1;
       ii. calcium chloride;
       iii. propylene glycol.

11. The fire protection container, comprising:
    a. an outer wall consisting of:
       i. water glass composed of a sodium silicate solution that is about 40% solids, 60% water, and having a $SiO_2$:$Na_2O$ ratio in the range of about 2:1 to 4:1;
       ii. calcium chloride;
       iii. water soluble oil; and
       iv. calcium oxide.

12. The fire protection container of claim 11, wherein said outer wall consists essentially of:
    a. 20 parts by weight of said water glass;
    b. 1 part by weight of said water soluble oil;
    c. 2 to 3 parts by weight of said calcium oxide; and
    d. 2.4 to 3.2 parts by weight of said calcium chloride.

* * * * *